United States Patent

Hitomi

Patent Number: 5,312,063
Date of Patent: May 17, 1994

[54] STOPPER APPARATUS FOR A SPINNING REEL

[75] Inventor: Yasuhiro Hitomi, Hashimoto, Japan

[73] Assignee: Shimano Inc., Osaka, Japan

[21] Appl. No.: 883,356

[22] Filed: May 15, 1992

[30] Foreign Application Priority Data

May 23, 1991 [JP] Japan ............ 3-036669[U]

[51] Int. Cl.$^5$ .............................................. A01K 89/02
[52] U.S. Cl. .................................... 242/248; 242/298; 188/82.3
[58] Field of Search .............. 242/247, 248, 243, 298; 188/82.3

[56] References Cited

U.S. PATENT DOCUMENTS

| | | | |
|---|---|---|---|
| 3,138,344 | 6/1964 | Small | 188/82.3 |
| 4,196,869 | 4/1980 | Shepherd | 242/248 X |
| 4,529,142 | 7/1985 | Yoshikawa | 242/243 |
| 4,546,932 | 10/1985 | Ohmori | 188/82.3 X |
| 4,614,314 | 9/1986 | Ban | 242/248 |
| 4,650,134 | 3/1987 | Councilman | 242/248 |
| 4,881,699 | 11/1989 | Emura | 242/248 |
| 5,221,057 | 6/1993 | Yoshikawa | 242/247 |

FOREIGN PATENT DOCUMENTS

3047379 12/1981 Fed. Rep. of Germany ...... 242/243

Primary Examiner—Daniel P. Stodola
Assistant Examiner—Michael R. Mansen
Attorney, Agent, or Firm—Dickstein, Shapiro & Morin

[57] ABSTRACT

A stopper apparatus for a spinning reel has a first stopper mechanism for stopping a rotary frame in a fixed phase, a second stopper mechanism for stopping the rotary frame in a plurality of phases, and a stopper switching mechanism for switching the first and second stopper mechanisms. The first stopper mechanism includes a first pawl, and a tooth formed on a rotary element rotatably mounted on a spool shaft. The second stopper mechanism includes a second pawl, and teeth formed on an inner peripheral wall of the rotary frame. The stopper switching mechanism includes a cam plate disposed between and engageable with the first pawl and second pawl and attached to a forward end of a shaft rotatable by a control knob. The cam plate is rotatable between a first position to operate only the first stopper mechanism, a second position to operate at least the second stopper mechanism, and a third position to render the first and second stopper mechanisms inoperative.

7 Claims, 8 Drawing Sheets

STOPPER APPARATUS FOR A SPINNING REEL

BACKGROUND OF THE INVENTION

1. Field of the Invention

This invention relates to a stopper apparatus for a spinning reel, and more particularly to a stopper apparatus having a first stopper mechanism for stopping a rotary frame in a fixed phase, a second stopper mechanism for stopping the rotary frame in a plurality of phases, and a stopper switching mechanism for switching the first and second stopper mechanisms, wherein the stopper switching mechanism has a first position to operate only the first stopper mechanism, a second position to operate only the second stopper mechanism or operate both the first and second stopper mechanisms, and a third position to render both the first and second stopper mechanisms inoperative.

2. Description of the Related Art

With this type of stopper apparatus for a spinning reel, when the above second position is established, the rotary frame may be stopped in a plurality of phases for normal fishing action. When the first position is established, the rotary frame is stopped in a fixed phase. That is, the rotary frame has an arm cam having a switching arm attached thereto for switching a bail arm to a line unwinding position. When the rotary frame is stopped in the above fixed phase, this switching arm lies close to a hand of the angler holding the fishing rod. The third position is effective for unwinding the fishing line to a small extent by turning the spool in a line unwinding direction with the bail arm maintained in a line winding position to check excessive unwinding of the fishing line.

In a conventional stopper apparatus having the above feature, two rotary elements forming part of a rotary frame drive system are loosely mounted adjacent to each other on a spool shaft. One of the rotary elements defines a plurality of engaging teeth peripherally thereof. The other rotary element defines a single engaging tooth peripherally thereof. A single pawl is provided which includes two engaging portions for engaging the teeth of one rotary element and the tooth of the other rotary element, respectively. However, since the single pawl acts on the teeth of the two rotary elements, the conventional stopper apparatus tends to break down easily and fails to assure a steady and reliable operation.

Further, since the rotary elements are rotatably mounted on the spool shaft, these elements must have limited diameters. As a result, the teeth of one of the rotary elements are formed at limited intervals to impair finely defined stopping phases of the rotary frame. Play occurring until the rotary frame stops sometimes allows escape of fish having struck.

SUMMARY OF THE INVENTION

The object of the present invention is to provide a stable and reliable stopper apparatus.

The above object is fulfilled, according to the present invention, by a stopper apparatus for a spinning reel comprising a first stopper mechanism including a first pawl, and a first engaging portion engageable with the first pawl; and a second stopper mechanism including a second pawl, and a plurality of second engaging portions engageable with the second pawl; wherein one of the first engaging portion and the plurality of second engaging portions is formed on a rotary element rotatably mounted on a spool shaft, and the other of the first engaging portion and the plurality of second engaging portions is formed on an inner peripheral wall of the rotary frame.

The above stopper apparatus has the following functions and effects.

The first pawl is engageable only with the first engaging portion, while the second pawl is engageable only with the second engaging portions. Thus, each pawl is operated less frequently than the single pawl in the conventional stopper apparatus. In addition, since the first engaging portion and second engaging portions are formed on the rotary frame and the rotary element mounted on the spool shaft, it is easy to find space for accommodating the engaging portions.

Consequently, the stopper apparatus according to the present invention is highly stable and reliable with the two pawls having a less chance of breakdown.

The first engaging portion may be formed on the rotary element, and the second engaging portion may comprise internal teeth formed on the inner peripheral wall of the rotary frame, the first pawl and the second pawl being operable in rotating directions of the rotary element and the rotary frame, respectively.

Where the pawls are operable in the rotating direction of the rotary elements, the pawls extend along the direction in which torque is applied from the rotary elements, with little chance of loads acting sideways on the pawls.

Further, since the peripheral inner wall of the rotary frame is used to define part of the second stopper mechanism requiring a plurality of engaging portions, these engaging portions may be formed on a large diameter portion of the peripheral inner wall. This allows a large number of teeth to be formed while securing a necessary tooth thickness. Consequently, the rotary frame may be stopped in finely defined phases to reduce play occurring till stoppage thereof and to reduce shocks of the engagement between the pawl and teeth.

This construction does not require the pawls to have an unduly large wall thickness or to be formed of a strong and expensive material. The useful stopper apparatus is thus realized by the simple modification to vary the operating directions of the pawls and by changing the components on which part of the apparatus is formed. In addition, the reduced shock of engagement reduces the chances of breaking the fishing line and of allowing fish to escape.

Other features and advantages of the invention will be apparent from the following description.

DETAILED DESCRIPTION OF THE PREFERRED EMBODIMENT

A stopper apparatus for a spinning reel according to the present invention will be described in detail with reference to the drawings.

Figure 8:
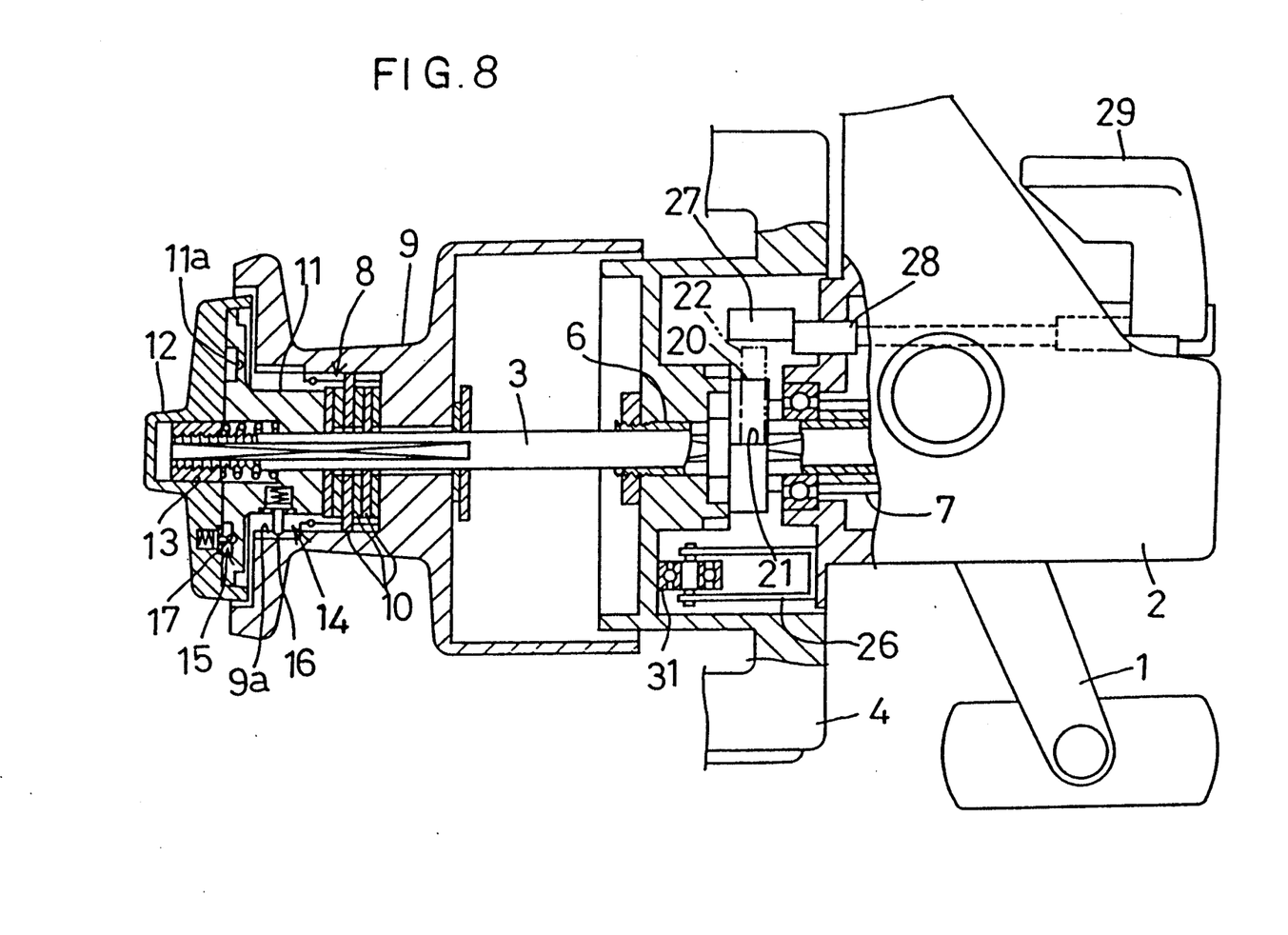
FIG. 8 is a side view, partly enlarged and in section, of a spinning reel.
Figure 9:
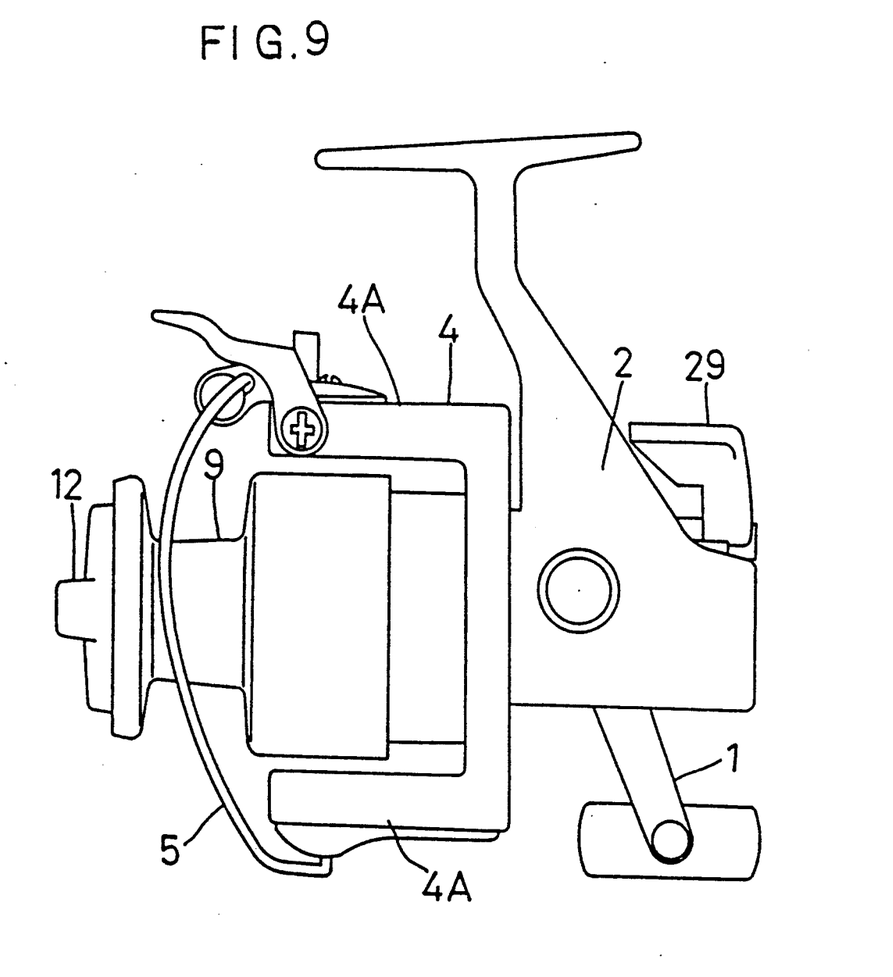
FIG. 9 is a side view of the spinning reel.

As shown in FIGS. 8 and 9, this spinning reel includes a line winding handle 1 attached to a reel body 2, and a spool shaft 3 extending from a forward end of the reel body 2. The spool shaft 3 supports a spool 9 and a rotary frame 4. A bail arm 5 extends between a pair of rotary arms 4A of the rotary frame 4 to be switchable between a line winding position and a line unwinding position. A sleeve shaft 6 is rotatably mounted on a proximal portion of the spool shaft 3 inside the reel body 2 to form part of a rotary frame drive line. The sleeve shaft 6 has a pinion gear 7 formed thereon for receiving drive from the handle 1. The rotary frame 4 is rotatable with the sleeve shaft 6. Further, a drag device 8 is mounted in a forwardly opening space defined by the spool 9.

As shown in FIG. 8, the drag device 8 includes a multidisk drag body 10 contained in the opening space of the spool 9, a pressing member 11 for pressing the drag body 10, and a drag knob 12 for moving the pressing member 11, all mounted on the spool shaft 3. The pressing member 11 is mounted on the spool shaft 3 to be rotatable therewith and axially slidable relative thereto. The drag knob 12 is mounted on the spool shaft 3 through a nut 13 screwed to the spool shaft 3. A first sound producing mechanism 14 and a second sound producing mechanism 15 are provided on the drag knob 12, pressing member 11 and spool 9.

The first sound producing mechanism 14 includes a sound producing piece 16 projecting from an outer periphery of the pressing member 11, and grooves 9a defined in an inner peripheral wall of the spool 9 and extending parallel to an axis of the spool 9. These grooves 9a are juxtaposed in the circumferential direction of the spool 9. When a fishing line is unwound from the spool 9 with the drag device 8 acting on the spool 9, the spool 9 rotates relative to the pressing member 11, whereby the sound producing piece 16 snaps in and out of the grooves 9a to produce a clicking sound. The second sound producing mechanism 15 includes a sound producing pin 17 projecting from an inward surface of the drag knob 12 toward the pressing member 11, and radial grooves 11a defined in a surface of the pressing member 11 opposed to the pin 17. The second sound producing mechanism 15 produces a clicking sound when the drag knob 12 is tightened.

A first stopper mechanism A and a second stopper mechanism B will be described next. The rotary frame 4 defines an interior space opposed to a front wall of the reel body 2 and recessed forwardly. As shown in FIGS. 1 through 5, the second stopper mechanism B includes engaging teeth 18 formed on an inner wall of the rotary frame 4 defining the interior space to act as second engaging portions, and a second pawl 19 attached to the front wall of the reel body 2 for engaging the second engaging teeth 18. The engagement between the second engaging teeth 18 and second pawl 19 is capable of stopping the rotary frame 4 in a plurality of phases. The first stopper mechanism A includes a rotary element 20 mounted for unitary rotation on the sleeve shaft 6 extending forwardly from the reel body 2, an engaging tooth 21 formed peripherally of the rotary element 20 to act as a first engaging portion, and a first pawl 22 attached to the front wall of the reel body 2 for engaging the first engaging tooth 21. The engagement between the first engaging tooth 21 and first pawl 22 is capable of stopping the rotary frame 4 in a fixed phase.

Figure 6:
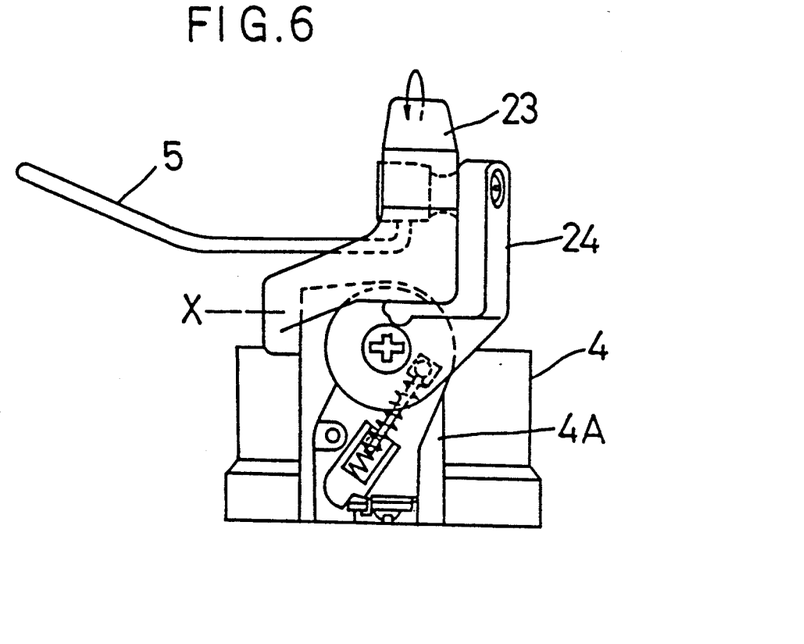
FIG. 6 is a plan view showing a bail arm in a line winding position.
Figure 7:
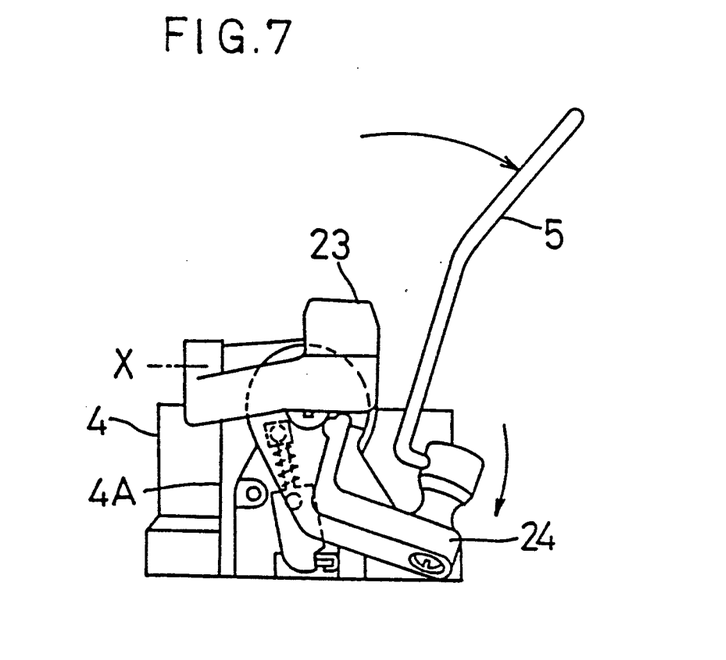
FIG. 7 is a plan view showing the bail arm in a line unwinding position.

As shown in FIGS. 6 and 7, one of the rotary arms 4A of the rotary frame 4 supports a switching arm 23 pivotable about a transverse axis X for forcibly switching the bail arm 5 to the line unwinding position. The switching arm 5 contacts an arm cam 24 supporting one end of the bail arm 5 for forcibly rotating the arm cam 24 to switch the bail arm 5 to the line unwinding position. When the rotary frame 4 is stopped by the first stopper mechanism A, the rotary arm 4A having the switching arm 23 stops at the position shown in FIG. 1. In this state, the switching arm 23 lies in a position operable by a thumb or finger of the angler holding the fishing rod.

Figure 1:
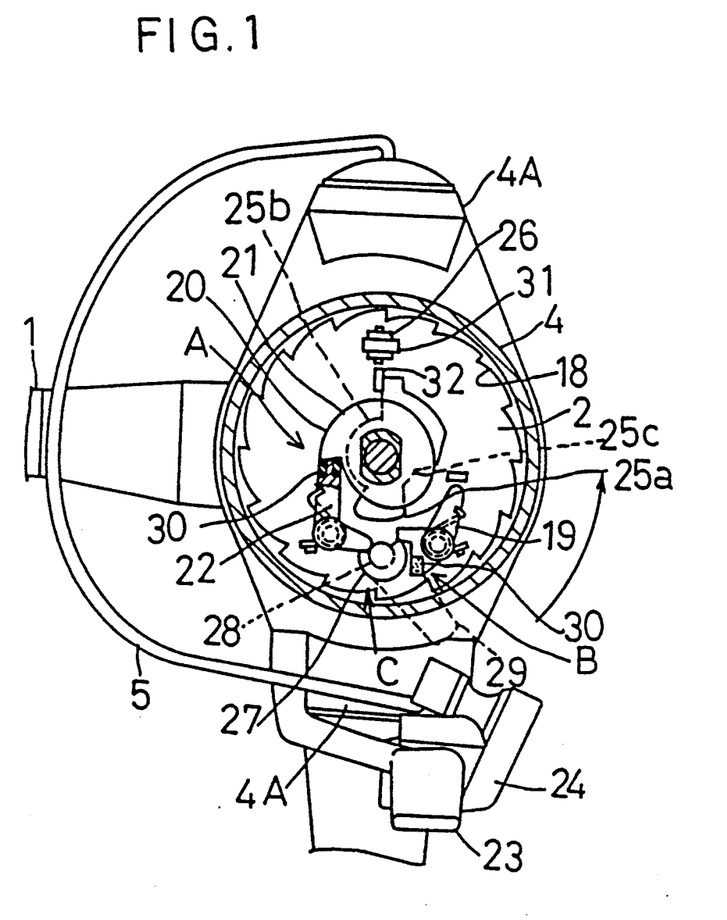
FIG. 1 is a front view in vertical section showing a stopper switching mechanism in a first position.

As shown in FIG. 1, the two pawls 19 and 22 are attached to the front wall of the reel body 2 to be pivotable about axes extending parallel to the axis of the spool shaft 3 and operable in a rotating direction of the rotary frame 4. Thus, the pawls 19 and 22 receive torque of the rotary frame 4 and rotary element 20 in longitudinal directions thereof, and hardly are subjected to loads acting transversely thereof.

Further, the two pawls 19 and 22 overlap each other in side view of the reel body 2. This arrangement provides the advantage that the pawls 19 and 22 occupy a reduced space axially of the spool shaft 3.

Figure 2:
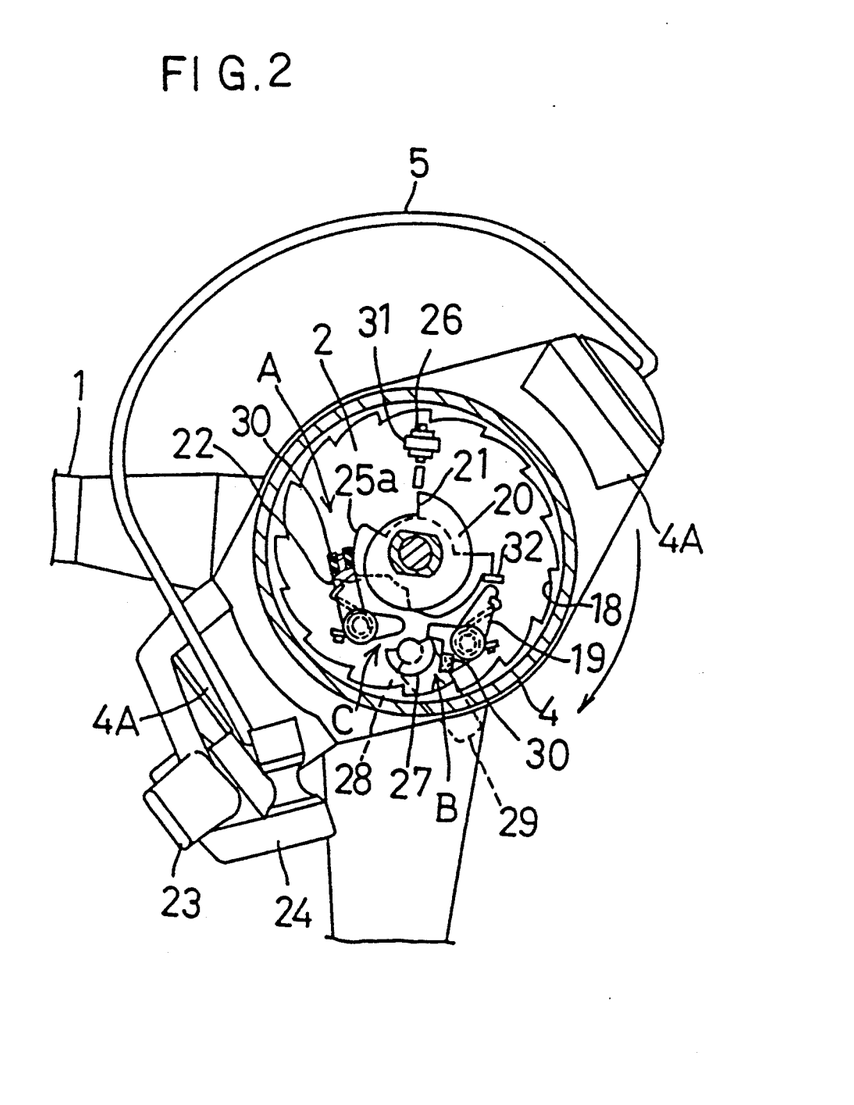
FIG. 2 is a front view in vertical section showing the stopper switching mechanism in the first position.
Figure 3:
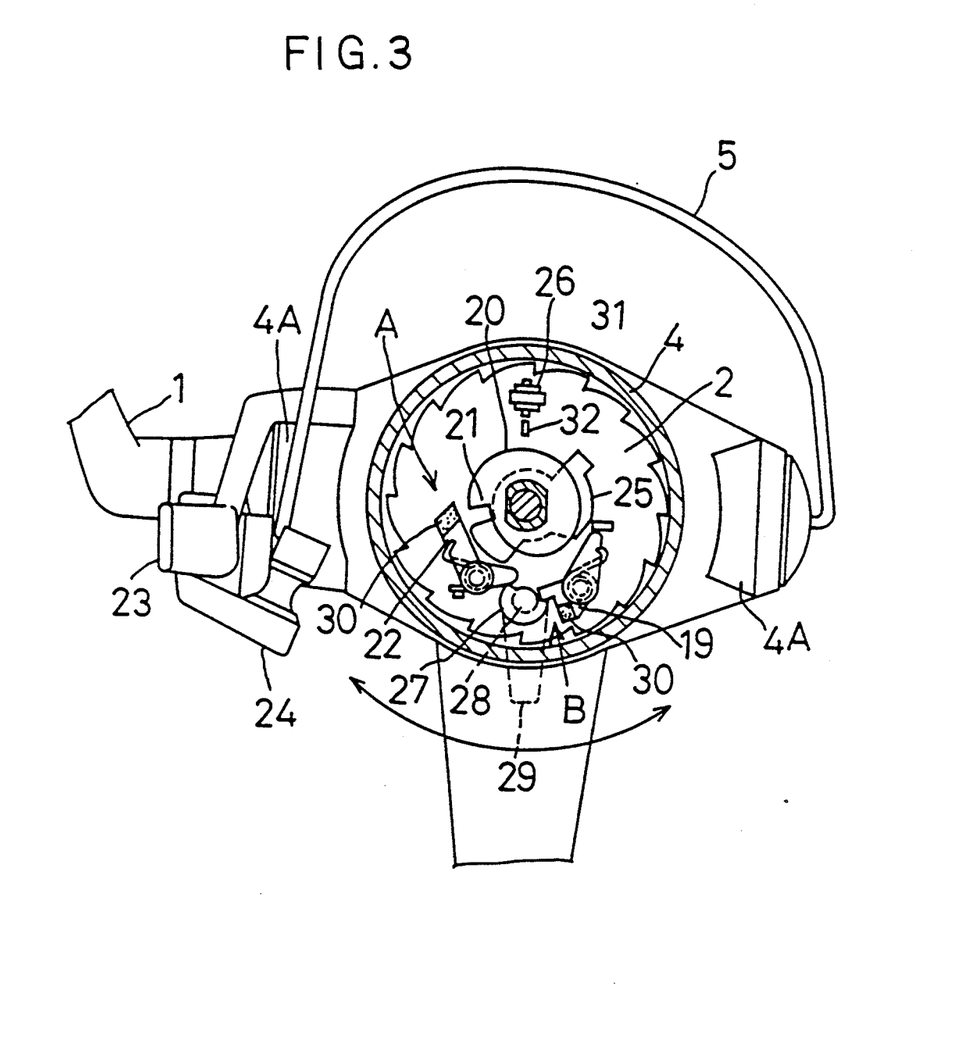
FIG. 3 is a front view in vertical section showing the stopper switching mechanism in a third position.
Figure 4:
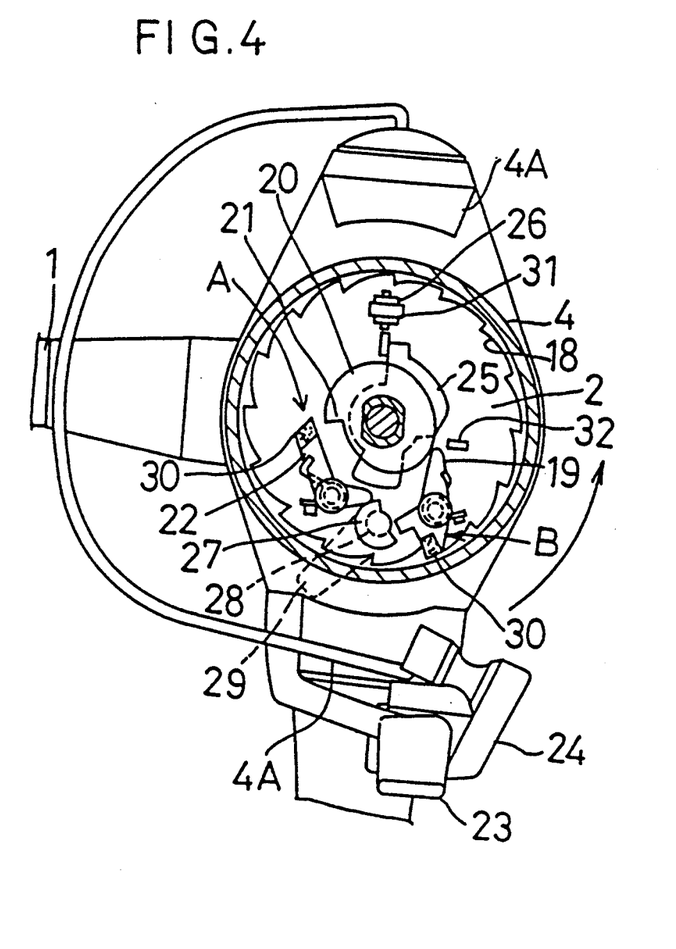
FIG. 4 is a front view in vertical section showing the stopper switching mechanism in a second position.
Figure 5:
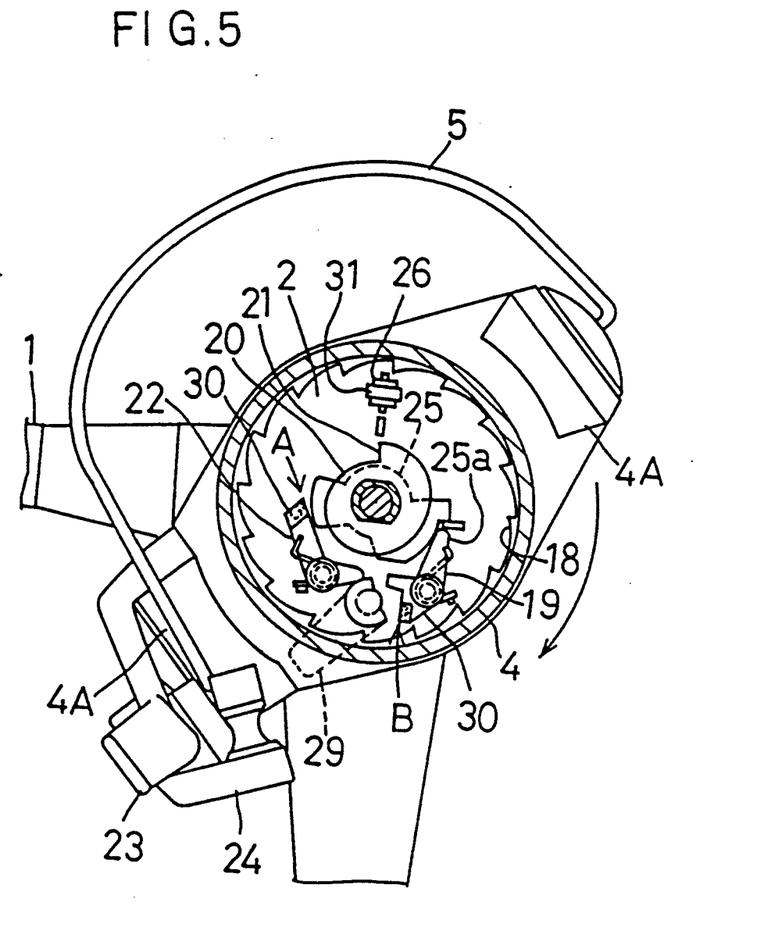
FIG. 5 is a front view in vertical section showing the stopper switching mechanism in the second position.

A stopper switching mechanism C for switching the two stopper mechanisms A and B will be described next. As shown in FIGS. 1 through 3, a cam plate 27 is disposed between the two pawls 19 and 22. This cam plate 27 is attached to a forward end of a rotary shaft 28. A control knob 29 is attached to the other end of the rotary shaft 28. The cam plate 27 is switchable by means of the control knob 29 to rotate leftward to a first position, rightward to a second position, and to an intermediate, third position. In the third position, as shown in FIG. 3, the cam plate 27 acts on non-working ends of the first and second pawls 19 and 22 to place these pawls in inoperative positions. When the cam plate 27 is rotated leftward from the third position, as shown in FIGS. 4 and 5, the cam plate 27 disengages from the second pawl 19 while remaining to engage the first pawl 22, to place the second stopper mechanism B in an operative position. When the cam plate 27 is rotated rightward from the third position, as shown in FIGS. 1 and 2, the cam plate 27 disengages from the first pawl 22 while remaining to engage the second pawl 19, to place the first stopper mechanism A in an operative position.

A rotary cam 25 is disposed in contact with a rear surface of the rotary element 20 rotatable with the sleeve shaft 6. The rotary cam 25 defines, peripherally thereof, a large diameter cam surface 25a and two small diameter cam surfaces 25b and 25c. The large diameter cam surface 25a is used to push up the first and second pawls 19 and 22 for placing the pawls in the respective inoperative positions. The small diameter cam surfaces 25b and 25c are used to place the first and second pawls 19 and 22 in the respective operative positions. Though not shown in the drawings, a friction mechanism is provided between the rotary cam 25 and rotary element 20 to allow the rotary cam 25 and rotary element 20 to rotate together. The rotary cam 25 is rotatable within a limited angle between right and left stop elements 32. Thus, when the rotary element 20 rotates in a line unwinding direction with the first pawl 19 and second pawl 22 in the operative positions, the two pawls 19 and 22 are pushed up by the large diameter cam surface 25a to the inoperative positions. When the rotary element 20 rotates in a line winding direction, the two pawls 19 and 22 drop to the small diameter cam surfaces 25b and 25c to take the operative positions.

A roller 31 for correcting position of the rotary frame 4 will be described next with reference to FIG. 8. The roller 31 which is a bearing type roller is attached to a bracket 26 extending from the front wall of the reel body 2, for contacting an inward vertical surface of the rotary frame 4. The roller 31 is disposed 180 degrees opposite the second pawl 19, and has a function to prevent the rotary frame 4 from tilting relative to the spool axis when only the second pawl 19 stops rotation of the rotary frame 4.

As shown in FIGS. 1 and 2, the first and second pawls 19 and 22 have elastic, e.g. rubber, caps 30 mounted on working ends thereof for acting on the engaging teeth 18 and 21, respectively. The caps 30 have distal ends projecting to greater extents than tip ends of the pawls 19 and 22. When the pawls 19 and 22 engage the teeth 18 and 21, the caps 30 are compressed from the state shown in FIG. 1 to the state shown in FIG. 2 to ease shocks and suppress noise of the engagement. However, it is not absolutely necessary for the distal ends of the caps 30 to project to greater extents than the tip ends of the pawls 19 and 22.

The components for defining the first engaging portion 21 and second engaging portions 18 are interchangeable.

It is not essential that the two pawls 19 and 22 overlap each other in side view of the reel body 2 as long as the pawls 19 and 22 are parallel to each other.

What is claimed is:

1. A spinning reel comprising:
   a reel body;
   a spool shaft extending forwardly from said reel body;
   a spool provided on said spool shaft;
   a rotor for winding a fishing line on said spool, said rotor being provided forwardly of said reel body, said rotor having an interior surface;
   an anti-reverse mechanism for restricting rotation of said rotor, said anti-reverse mechanism including:
   (A) a first stopper for restricting rotation of said rotor at a single position, said first stopper including:
      (a) a first engaging portion including a single outwardly directed tooth, wherein said first engaging portion rotates with said rotor; and
      (b) a first engaging pawl supported on said reel body, said first engaging pawl being displaceable such that said first engaging pawl and said first engaging portion are selectively engageable and disengageable; and
   (B) a second stopper for restricting rotation of said rotor at a plurality of positions, said second stopper including:
      (a) a second engaging portion including a plurality of inwardly extending teeth defined on said interior surface of said rotor and surrounding said first engaging portion, and wherein said second engaging portion rotates with said rotor; and
      (b) a second engaging pawl supported on said reel body, said second engaging pawl being displaceable such that said second engaging pawl and said second engaging portion are selectively engageable and disengageable; and
   switch over means for controlling said first engaging pawl and said second engaging pawl, said switch over means being switchable between first, second and third positions; wherein said first stopper is operable and said second stopper is inoperable, with said second engaging pawl being disengaged from said second engaging portion, when said switch over means is in said first position; wherein said second stopper is operable and said first stopper is inoperable, with said first engaging pawl being disengaged from said first engaging portion, when said switch over means is in said second position; and wherein said first and second stoppers are both inoperable, with said first and second engaging pawls both being disengaged from said first and second engaging portions, when said switch over means is in said third position.

2. A spinning reel as claimed in claim 1, wherein said first engaging pawl (22) has a pivot axis that is parallel to said spool shaft (3), and wherein said second engaging pawl (19) has a pivot axis that is parallel to said spool shaft.

3. A spinning reel as claimed in claim 2, wherein said first and second engaging pawls are displaceable in a single plane, said plane being normal to said spool shaft.

4. A spinning reel as claimed in claim 3, wherein said switch over means includes a single switch over member (27) for controlling said first and second engaging pawls.

5. A spinning reel as claimed in claim 1, wherein said first engaging pawl, when engaged with said first engaging portion, is substantially normal to a straight line extending radially from the axis of said rotor to said first engaging portion.

6. A spinning reel as claimed in claim 1, wherein said first and second engaging pawls have engaging tips, and elastic members (30) mounted on said engaging tips for engaging said first and second engaging portions.

7. A spinning reel as claimed in claim 1, wherein said first and second engaging pawls have first and second operated portions, respectively, and wherein said switch over means is located between said first and second engaging pawls, and wherein said switch over means includes a pivotable cam plate (27), and a first operating portion engageable with said first operated portion and a second operating portion engageable with said second operated portion, and an operating lever (29) for operating said cam plate.

* * * * *